(12) United States Patent
Lawther et al.

(10) Patent No.: US 8,122,356 B2
(45) Date of Patent: Feb. 21, 2012

(54) METHOD FOR IMAGE ANIMATION USING IMAGE VALUE RULES

(75) Inventors: Joel S. Lawther, Pittsford, NY (US);
Cathleen D. Cerosaletti, Rochester, NY (US); Alexander C. Loui, Penfield, NY (US); Annette L. Thompson, Rochester, NY (US); Samuel M. Fryer, Fairport, NY (US); Edward Covannon, Ontario, NY (US); Madirakshi Das, Penfield, NY (US); Dale F. McIntyre, Honeoye Falls, NY (US); Michael J. Telek, Pittsford, NY (US); Stacie L. Hibino, San Jose, CA (US)

(73) Assignee: Eastman Kodak Company, Rochester, NY (US)

( * ) Notice: Subject to any disclaimer, the term of this patent is extended or adjusted under 35 U.S.C. 154(b) by 1175 days.

(21) Appl. No.: 11/866,636

(22) Filed: Oct. 3, 2007

(65) Prior Publication Data
US 2009/0094518 A1      Apr. 9, 2009

(51) Int. Cl.
*G06F 3/00*       (2006.01)
(52) U.S. Cl. ........................................ 715/716; 715/730
(58) Field of Classification Search .................. 715/730, 715/716
See application file for complete search history.

(56) References Cited

U.S. PATENT DOCUMENTS

| | | | |
|---|---|---|---|
| 5,294,978 A | 3/1994 | Katayama | |
| 5,802,361 A | 9/1998 | Wang et al. | |
| 6,008,820 A | 12/1999 | Chauvin et al. | |
| 6,046,848 A | 4/2000 | Gulick, Jr. et al. | |
| 6,462,785 B1 | 10/2002 | Carraro et al. | |
| 6,671,405 B1 | 12/2003 | Savakis et al. | |
| 6,748,097 B1 | 6/2004 | Gindclc et al. | |
| 6,847,733 B2 | 1/2005 | Savakis et al. | |
| 6,930,687 B2 | 8/2005 | Grosvenor et al. | |
| 6,937,272 B1 | 8/2005 | Dance | |
| 6,957,398 B1 | 10/2005 | Nayeri | |
| 7,050,494 B1 | 5/2006 | Yamada | |
| 7,053,951 B2 | 5/2006 | Miller et al. | |
| 7,071,914 B1 | 7/2006 | Marks | |
| 7,116,328 B2 | 10/2006 | Kawai et al. | |
| 7,156,519 B2 | 1/2007 | Mao et al. | |
| 7,158,169 B1 | 1/2007 | Farber et al. | |
| 7,187,412 B1 | 3/2007 | Silverstein | |
| 7,212,668 B1 | 5/2007 | Luo et al. | |
| 7,262,766 B2 * | 8/2007 | Minami et al. | 345/419 |
| 7,340,676 B2 * | 3/2008 | Geigel et al. | 715/716 |
| 7,546,536 B2 * | 6/2009 | Imanishi | 715/753 |
| 7,555,730 B2 * | 6/2009 | Atkins | 715/853 |
| 7,617,454 B2 * | 11/2009 | Ubillos | 715/716 |

(Continued)

*Primary Examiner* — Omar Abdul-Ali
(74) *Attorney, Agent, or Firm* — Roland R. Schindler; Raymond L. Owens

(57) ABSTRACT

A method for image presentation are provided, in which at least one theme for image presentation is obtained; at least one set of images is acquired for presentation in association with each theme; and a presentation area image is generated for presentation on a display with a plurality of separate presentation objects in the presentation area image; an image value for each of the acquired images is determined; an emphasis score is determined for each of the acquired images. The presentation area image is presented with one of the acquired images in each of the presentation objects; and the presentation objects are animated by moving the presentation objects relative to each other in a manner that attracts more attention to presentation objects that are used to present images having a higher emphasis score than presentation objects that are used to simultaneously present images having a lower emphasis score.

20 Claims, 11 Drawing Sheets

U.S. PATENT DOCUMENTS

| | | |
|---|---|---|
| 7,945,848 B2* | 5/2011 | Kasperkiewicz et al. ..... 715/205 |
| 2002/0060701 A1* | 5/2002 | Naughton et al. ............ 345/853 |
| 2004/0090460 A1* | 5/2004 | Kawahara ..................... 345/764 |
| 2004/0205515 A1* | 10/2004 | Socolow et al. ........... 715/501.1 |
| 2005/0105803 A1 | 5/2005 | Ray |
| 2006/0101339 A1* | 5/2006 | Katsumata .................... 715/730 |
| 2006/0256140 A1 | 11/2006 | Turner |
| 2007/0271524 A1* | 11/2007 | Chiu et al. .................... 715/767 |
| 2008/0208791 A1* | 8/2008 | Das et al. ......................... 707/1 |
| 2008/0222560 A1* | 9/2008 | Harrison ....................... 715/800 |

* cited by examiner

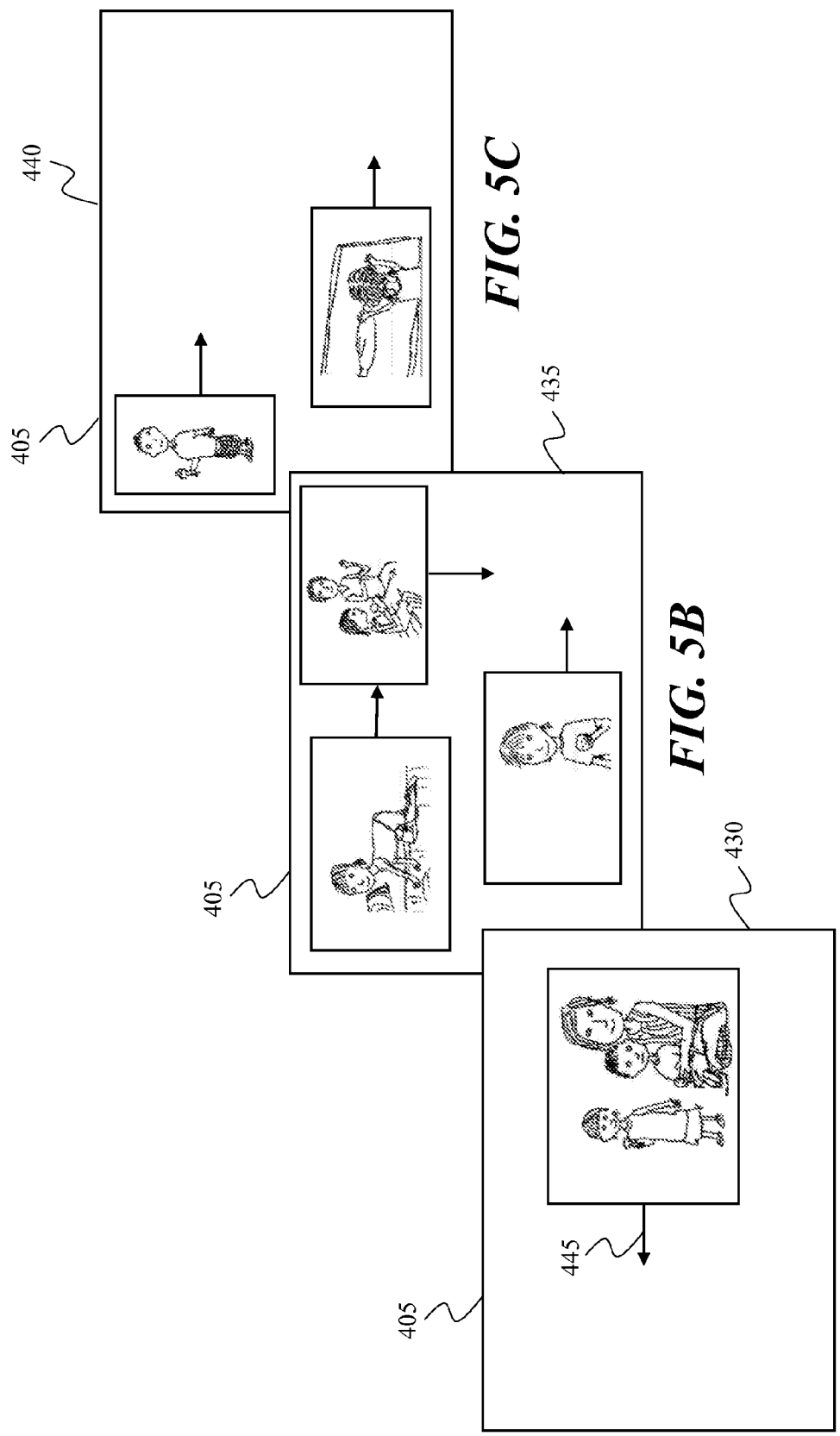

METHOD FOR IMAGE ANIMATION USING IMAGE VALUE RULES

FIELD OF THE INVENTION

The present invention relates to the production and viewing of an image-based presentation of digital media from a digital media collection.

BACKGROUND OF THE INVENTION

With the advent of inexpensive, portable digital imaging devices, there has been a dramatic growth of digital images captured. In addition, since the capture of digital images no longer require the cost of film and the corresponding printing of the film images, there are little constraints to the number of images that can be taken with digital devices. Multi-gigabyte camera cards and near terabyte computer hard drives enable the retention of digital image files more than ever before. However, the viewing of these images still requires time to comprehend the context and subject of digital images. A computer slide show is able to present a mere fraction of a typical image collection in the duration that a consumer is willing to sit and watch the images fade in and out on a screen. Yet even when playing a slide show, it is difficult to view images that are not displayed in proper sequencing or in context with others.

Furthermore, organizing images for viewing is a time consuming task that few are willing to take on. Although tagging of images enables key words to be searched using basic search engines, there still remains a need for the indexing of image content in conjunction with the playback and visualization of these images in context from one's image collection. In addition, it is an unmet need for presenting images that are logically related with each other in a manner that emphasizes certain images over others. Moreover, a large number of images should be cued and presented simultaneously in a rapid manner using an entertaining animation to take advantage of the peripheral vision of a viewer without compromising a viewer's comprehension of the visual content. It is the purpose of this invention to overcome these deficiencies over the current state of the art.

SUMMARY OF THE INVENTION

It is an object of the present invention to logically group and present an increased amount of digital media on the same presentation area. This object is achieved by a method of image-based presentation comprising:

(a) Obtaining at least one set of images for image presentation;

(b) Generating a presentation area image for presentation on a display having a plurality of separate presentation objects in the presentation area;

(c) Determining an image value for each of the acquired images by analyzing the images according to an image value metric;

(d) Presenting the presentation area image with one of the acquired images in each of the presentation objects and with the presented images being selected such that there will be at least a range of different image values for the images presented at any one moment in time;

(e) Animating the presentation objects within the presentation area image by moving the presentation objects relative to each other in a manner that attracts more attention to presentation objects that are used to present images having a higher image value than presentation objects that are used to simultaneously present images having a lower image value.

This method has the advantage of producing a presentation from a given set of digital media that can be viewed by a person. It also enables many images to be selectively viewed within a given time sequence.

BRIEF DESCRIPTION OF THE DRAWINGS

The subject matter of the invention is described with reference to the embodiments shown in the drawings.

FIG. 5 is representation of layers of image sets and motion vectors;

DETAILED DESCRIPTION OF THE INVENTION

In the following description, some embodiments of the present invention will be described as software programs. Those skilled in the art will readily recognize that the equivalent of such a method can also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
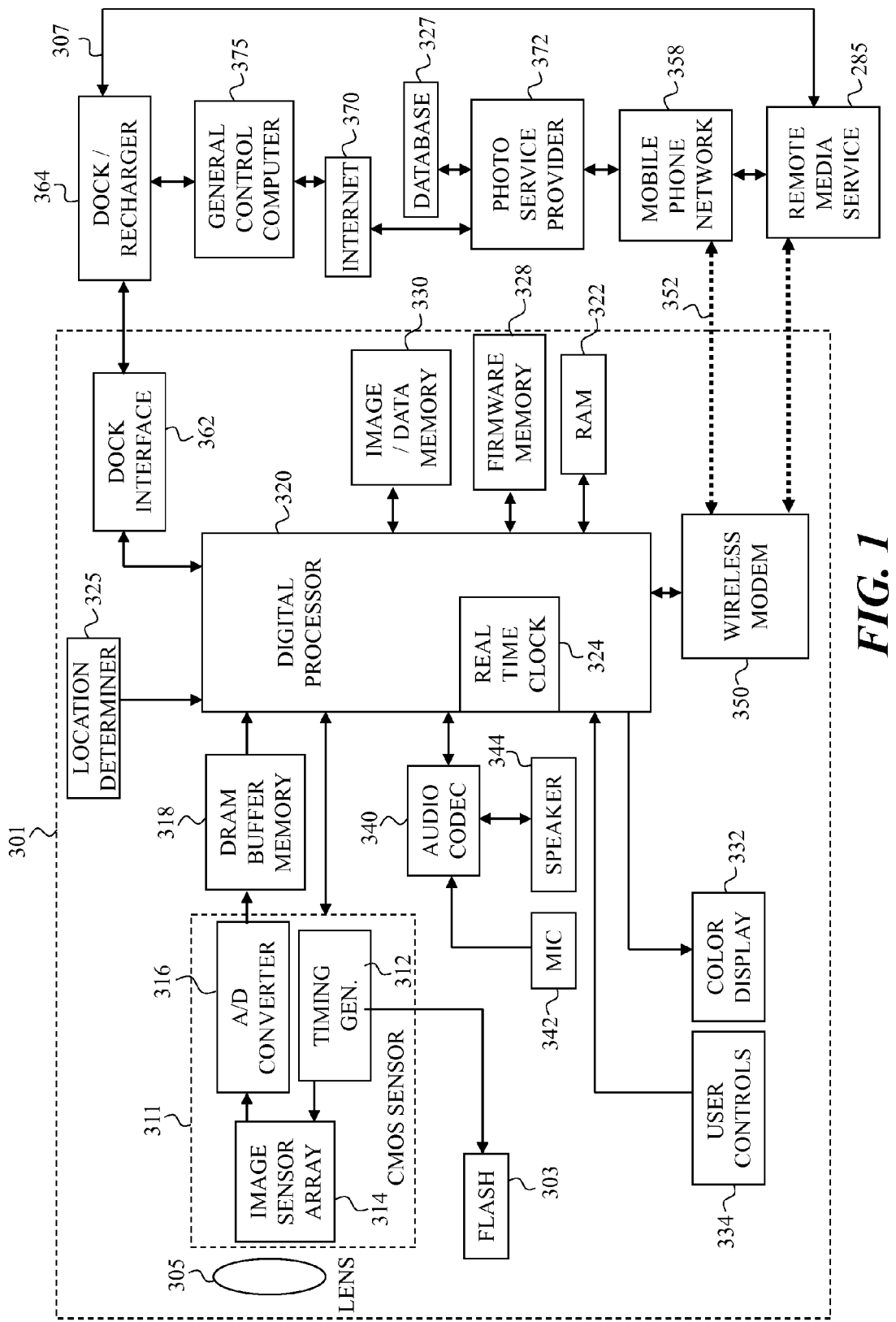
FIG. 1 is a block diagram of a digital multimedia presentation and capture device that can implement the present invention.

FIG. 1 is a block diagram of one embodiment of a multimedia presentation device 301 taking the form of a digital camera phone. Other embodiments of multimedia presentation device 301 can include televisions, portable or non-portable computers and displays, digital cameras or media players such as those with internal memory or those with removable memory such as a Digital Versatile Disk or gaming platforms. A multimedia presentation device 301 can be a portable battery operated device, small enough to be easily handheld by a user when capturing and reviewing images.

In the embodiment of FIG. 1, multimedia presentation device 301 includes a CMOS image sensor 311 having a lens system 305 that focuses light from a scene (not shown) onto an image sensor array 314. Lens system 305 can have a single lens or it can have one or more elements. Lens system 305 can be of a fixed focus type or can be manually or automatically adjustable. Lens system 305 is optionally adjustable to provide a variable zoom that can be varied manually or automatically. Other known arrangements can be used for lens system 305.

Light from the scene that is focused by lens system 305 onto image sensor array 314 is converted into image signals representing an image of the scene. Image sensor array 314 can take any number of forms and can, for example, comprise a charge couple device (CCD), a complimentary metal oxide sensor (CMOS), or any other electronic image sensor known to those of ordinary skill in the art. Image sensor array 314 provides a number of discrete sensing locations known as picture elements or "pixels" forming the image. The exact number of pixels provided by image sensor array 314 is not critical. In one non-limiting example, the image sensor array can comprise an arrangement of 1280 columns×960 rows of pixels.

In the embodiment of FIG. 1, image sensor array 314 comprises a CMOS image sensor 311 that can provide color image information using the well-known Bayer color filter pattern and is controlled by timing generator 312, which also controls an optional flash 303 in order to illuminate the scene when the ambient illumination is low.

In the embodiment of FIG. 1, image sensor array 314 provides analog signals representing an amount of light incident on each pixel during an exposure period. The analog signals are amplified and converted to digital data by an analog-to-digital (A/D) converter circuit 316 which, in this embodiment is formed on CMOS image sensor 311. However, in other embodiments, image sensor array 314 can provide digital data without conversion.

The digital data from image sensor array 314 is stored in a DRAM buffer memory 318 and subsequently processed by a digital processor 320 in accordance with instructions in digital processor 320 or in accordance with programs stored in firmware memory 328, which can be flash EPROM memory. The digital processor 320 can include a real-time clock 324, which keeps the date and time even when the multimedia presentation device 301 and digital processor 320 are in their low power state. Digital processor 320 stores the processed digital data as a digital image in a memory 330.

The digital image can comprise one or more still images, multiple still images and/or a stream of apparently moving images such as a video segment. Where the digital image comprises a stream of apparently moving images, the digital image can comprise image data stored in an interleaved or interlaced image form, a sequence of still images, and/or other forms known to those of skill in the art of digital video. In some embodiments, multimedia presentation device 301 can also store video clips by summing multiple pixels of the image sensor array 314 together (e.g. summing pixels of the same color within each 4 column×4 row area of the image sensor array 314) to produce a lower resolution video image frame. The video image frames are read from the image sensor array 314 at regular intervals, for example, using a 30 frame per second readout rate.

Digital processor 320 can apply various image processing algorithms to the image signals when forming a digital image. These can include, but are not limited to, color and exposure balancing, interpolation and compression. Where the image signals are in the form of analog signals, digital processor 320 also converts these analog signals into a digital form. For example, in one embodiment of the still image mode, digital processor 320 performs color interpolation followed by color and tone correction, in order to produce rendered sRGB image data or other forms of rendered digital image data.

Digital processor 320 can also be used to generate metadata in association with each image. Metadata is data that is related to a digital image or a portion of a digital image but that is not necessarily observable in the image data itself. In this regard, digital processor 320 can receive signals from user controls 334, audio codec 340 and, optionally, generates metadata based upon such signals. The metadata can include, but is not limited to, information such as the time, date and location that the image was captured, the type of CMOS image sensor 311, mode setting information, integration time information, taking lens unit setting information that characterizes the process used to capture the image, and processes, methods and algorithms used by multimedia presentation device 301 to form the image. The metadata can also include, but is not limited to, any other information determined by digital processor 320 or stored in any memory in multimedia presentation device 301 such as information that identifies multimedia presentation device 301, and/or instructions for rendering or otherwise processing the digital image with which the metadata is associated. The metadata can also comprise an instruction to incorporate a particular message into digital image when presented. Such a message can be a text message to be rendered when the digital image is presented or rendered. The metadata can also include audio signals. The metadata can further include digital image data. The metadata can also include any other information entered into multimedia presentation device 301.

The digital images and optional metadata, can be stored in a compressed form. For example, where the digital image comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Other image compression and storage formats can be used. This format includes an Exif application segment that stores particular image metadata using various TIFF tags. Separate TIFF tags can be used, for example, to store the date and time the picture was captured, the lens f/number and other camera settings, and to store image captions. In particular, the Image Description tag can be used to store labels. Real-time clock 324 provides a capture date/time value, which is stored as date/time metadata in each Exif image file.

Similarly, other compression systems including but not limited to the MPEG-4 (Motion Pictures Export Group) or Apple Quicktime™ standard can be used to store digital images and metadata.

The processed digital images are stored in the image/data memory 330. Image/data memory 330 can also be used to store the personal profile information in person profile database 235. Image/data memory 330 can also store other types of data, such as phone numbers, to-do lists, and the like.

In the embodiment of FIG. 1, location determiner 325 provides the geographic location associated with an image capture so that digital processor 320 can incorporate such information into the metadata. Location determiner 325 can use any of a number of methods for determining the location of the image. For example, the geographic location can be determined by receiving communications from the well-known Global Positioning Satellites (GPS). The location is preferably stored in units of latitude and longitude, however, other forms of location information can be used. Note that location determiner 325 can determine the geographic location at a time slightly different than the image capture time. In that case, location determiner 325 can use a geographic location from the nearest time as the geographic location associated with the image. Alternatively, location determiner 325 can interpolate between multiple geographic positions at times before and/or after the image capture time to determine the geographic location associated with the image capture. Interpolation can be necessitated because it is not always possible for location determiner 325 to determine a geographic location. For example, the GPS receivers often fail to detect signal when indoors. In this case, the last successful geographic location reading (i.e. prior to entering the building) can be used by location determiner 325 to estimate the geographic location associated with a particular image capture.

Digital processor 320 can also produce a low-resolution "thumbnail" size image, which can be produced as described in commonly-assigned U.S. Pat. No. 5,164,831 to Kuchta et al., the disclosure of which is incorporated by reference herein. The thumbnail image can be stored in RAM memory 322 and supplied to a color display 332, which can be, for example, an active matrix LCD or an organic light emitting diode (OLED) display. After images are captured, they can be quickly reviewed on the color LCD image display 332 by using the thumbnail image data.

The graphical user interface displayed on color display 332 is controlled by user controls 334. Digital processor 320 is adapted to receive user input and identified requests from user controls 334. User controls 334 can include dedicated push buttons (e.g. a telephone keypad) to dial a phone number, a control to set the mode (e.g. "phone" mode, "camera" mode), a joystick controller that includes 4-way control (up, down, left, right) and a push-button center "OK" switch, or the like. Additional user controls 334 can comprise of a touch screen associated with color display 332 such as found in the "KODAK EasyShare One" digital camera or an attached mouse controller device associated with general control computer 375.

An audio codec 340 connected to the digital processor 320 receives an audio signal from a microphone 342 and provides an audio signal to a speaker 344. These components can be used both for telephone conversations and to record and playback an audio track, along with a video sequence or still image. Speaker 344 can also be used to inform the user of an incoming phone call. This can be done using a standard ring tone stored in firmware memory 328, or by using a custom ring-tone downloaded from a mobile phone network 358 and stored in image/data memory 330. In addition, a vibration device (not shown) can be used to provide a silent (e.g. non audible) notification of an incoming phone call.

A dock interface 362 can be used to connect multimedia presentation device 301 to a dock/charger 364, which is connected to a general control computer 375. Dock interface 362 can conform to, for example, the well-know USB interface specification. Alternatively, the interface between multimedia presentation device 301 and general control computer 375 can be a wireless interface, such as the well-known Bluetooth wireless interface or the well-know 802.11b wireless interface. The dock interface 362 can be used to download images from the image/data memory 330 to the general control computer 375. The dock interface 362 can also be used to transfer calendar information from the general control computer 375 to the image/data memory 330 in the multimedia presentation device 301. Dock/charger 364 can also be used to recharge the batteries (not shown) in digital multimedia presentation device 301.

In the embodiment of FIG. 1, digital processor 320 is coupled to an optional wireless modem 350, which enables multimedia presentation device 301 to transmit and receive information via a Radio Frequency (RF) channel 352. A wireless modem 350 communicates over a radio frequency (e.g. wireless) link with mobile phone network 358, such as a 3GSM network. The mobile phone network 358 communicates with a photo service provider 372 and companion database 327, which can exchange digital images with multimedia presentation device 301. These images can also be accessed via Internet 370 by other devices, including the general control computer 375. Mobile phone network 358 also connects to a standard telephone network (not shown) in order to provide normal telephone service. In addition, the radio frequency link can also access public broadcast media such as television and radio from a remote media source 285. Broadcast media can also be accessed directly from a common cable media provider such as Time Warner Cable, using a common cable TV interface 307 or through mobile phone network 358 or through Internet 370. Email, text or media messaging can be a remote media source 285 as well.

Figure 2:
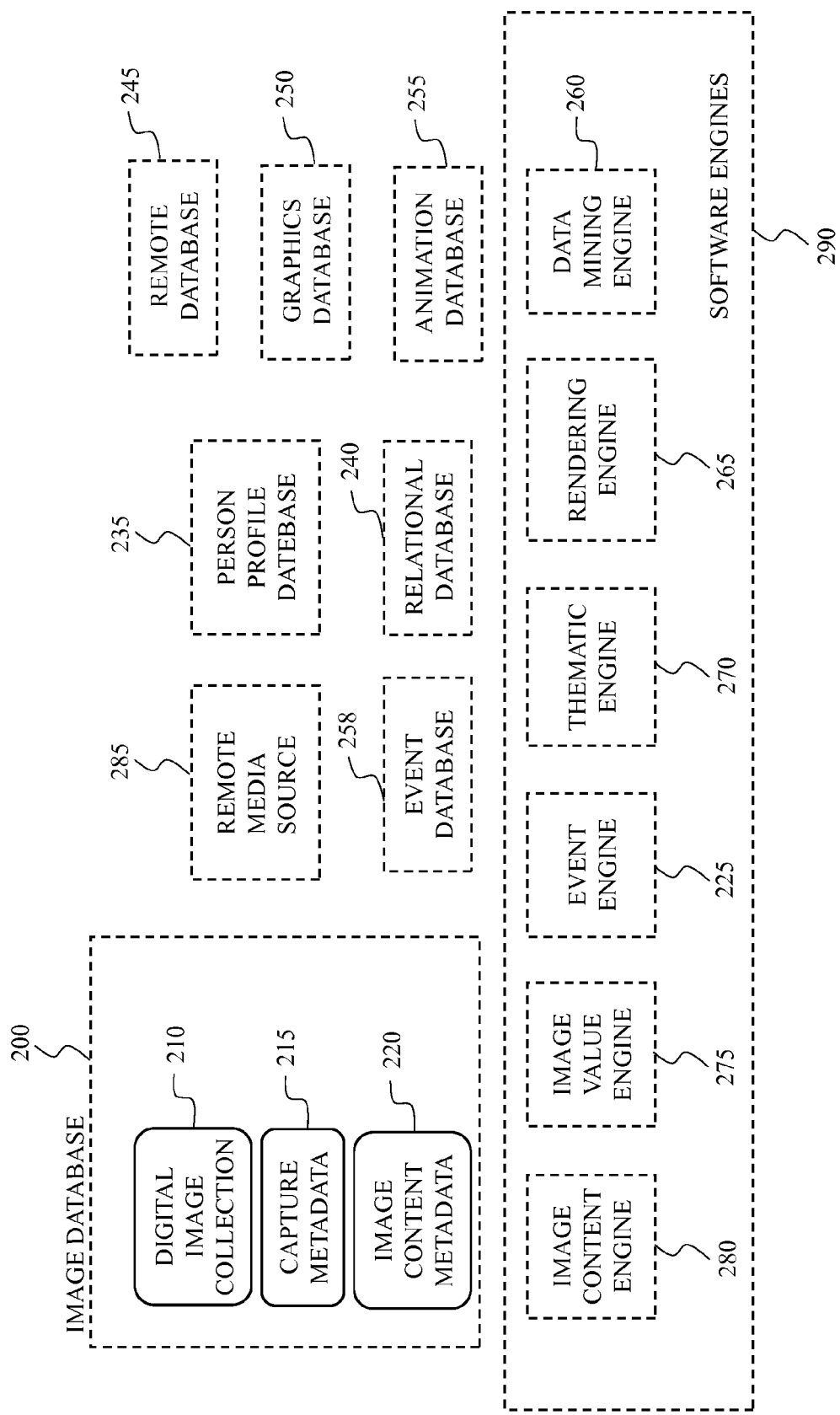
FIG. 2 is a database and software block diagram of an embodiment of the present invention.

One embodiment of a database and software block diagram is illustrated in FIG. 2. With brief reference back to FIG. 1, image/data memory 330, firmware memory 328, RAM memory 322 and digital processor 320 can be used to provide the necessary data storage and computational functions as described below. The term "digital processor" is intended to be a synonym for or include any data processing device, such as a central processing unit ("CPU"), a desktop computer, a laptop computer, a mainframe computer, a personal digital assistant, a Blackberry™, or any other device for processing data, managing data, or handling data, whether implemented with electrical, magnetic, optical, biological components, or otherwise.

As shown in FIG. 2, an image database 200 is provided consisting of a digital image collection 210 and companion capture metadata 215 and image content metadata 220. Remote media source 285 represents channels or sources of visual media. Examples of visual media from a remote media source 285 include streaming media from television stations, a playing song on radio stations, or Internet-based streaming content. Remote database 245 can be personal libraries of media, media available for download and purchase or libraries of shared media collections from other users or third parties. Remote database 245 can be accessed from Internet 370 or the mobile phone network 358 or a photo service provider 372. Person profile database 235 contains user information such as phone number, birthday, name, appearance information, addresses, likes, dislikes, and other information about a user. Additional personal profile database methods are described in commonly assigned U.S. Pat. No. 5,652,880 to Seagraves, the disclosure of which is herein incorporated by reference. Relational database 240 works in conjunction with person profile database 235 to provide tree structure or unstructured data storage known as "triples" used by artificial intelligence engines. Such data structures can provide data linkage to other people which can include friends, family, social networks, groups or teams one belongs to. Linkages are also made using content-based text retrieval from media content. This can include objects, places and events that are found in conjunction with people in media files using image content engine 280. Image content engine 280 is one of several software engines 290. In this embodiment, image content engine 280 derives text-based descriptions of media using methods described in commonly assigned U.S. Pat. No. 5,697,001 to Ring et al., which describes methods of extracting object data within images and is incorporated by reference herein. Briefly stated, a photographic camera includes an electronic image processing system comprising a computer and the electronic camera, wherein the computer interfaces with the output section in the camera and accesses the image data and the object data in order to characterize the objects within the image.

Event engine 225 clusters images into events producing event database 258. Events may be a birthday party, vacation, collection of family moments or a soccer game. Such events may also be broken into sub-events. A birthday party may comprise cake, presents, and outdoor activities. A vacation may be a series of sub-events associated with various cities, times of the day, visits to the beach etc. Events can be tagged manually or can be clustered automatically. U.S. Pat. No. 6,606,411, assigned to Loui et al., entitled "A method for automatically classifying images into events," issued Aug. 12, 2003 and, U.S. Pat. No. 6,351,556, assigned to Loui et al., entitled "A method for automatically comparing content of images for classification into events", issued Feb. 26, 2002, disclose algorithms for clustering image content by temporal events and sub-events. The disclosure of the above two patents are herein incorporated by reference. According to U.S. Pat. No. 6,606,411, events have proximate capture time & date and usually consistent color distributions. Therefore, these pictures are likely to have been taken with the same backdrop. For each sub-event, a single color and texture representation is computed for all background areas taken together. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Briefly summarized, a collection of images is classified into one or more events determining one or more largest time differences of the collection of images based on time and/or date clustering of the images and separating the plurality of images into the events based on having one or more boundaries between events which one or more boundaries correspond to the one or more largest time differences. For each event, sub-events (if any) can be determined by comparing the color histogram information of successive images as described in U.S. Pat. No. 6,351,556. Dividing an image into a number of blocks and then computing the color histogram for each of the blocks can accomplish this. A block-based histogram correlation procedure is used as described in U.S. Pat. No. 6,351,556 to detect sub-event boundaries. Another method of automatically organizing images into events is disclosed in U.S. Pat. No. 6,915,011, assigned to Loui et al., entitled "Event clustering of images using foreground and background segmentation" issued Jul. 5, 2005, which is herein incorporated by reference. Briefly summarized, according to one aspect of the above invention, an event clustering method uses foreground and background segmentation for clustering images from a group into similar events. Initially, each image is divided into a plurality of blocks, thereby providing block-based images. Utilizing a block-by-block comparison, each block-based image is segmented into a plurality of regions comprising at least a foreground and a background. One or more luminosity, color, position or size features are extracted from the regions and the extracted features are utilized to estimate and compare the similarity of the regions comprising the foreground and background in successive images in the group. Then, a measure of the total similarity between successive images is computed, thereby providing image distance between successive images, and event clusters are delimited from the image distances.

Data mining engine 260 derives threads of semantic information through analysis of image database 200, remote database 245, event database 258, person profile database 235, and relational database 240. Thematic engine 270 determines themes from semantic information found by data mining engine 260. Rendering engine 265 produces the visual display using animation database 255, graphics database 250, and imagery derived from image database 200, remote database 245, and remote media sources 285.

Image value engine 275 is adapted to determine an image value for each of the acquired images is determined by analyzing the images according to an image value metric. Methods that can be used to determine the image value metric will be discussed in greater detail below.

Figure 3:
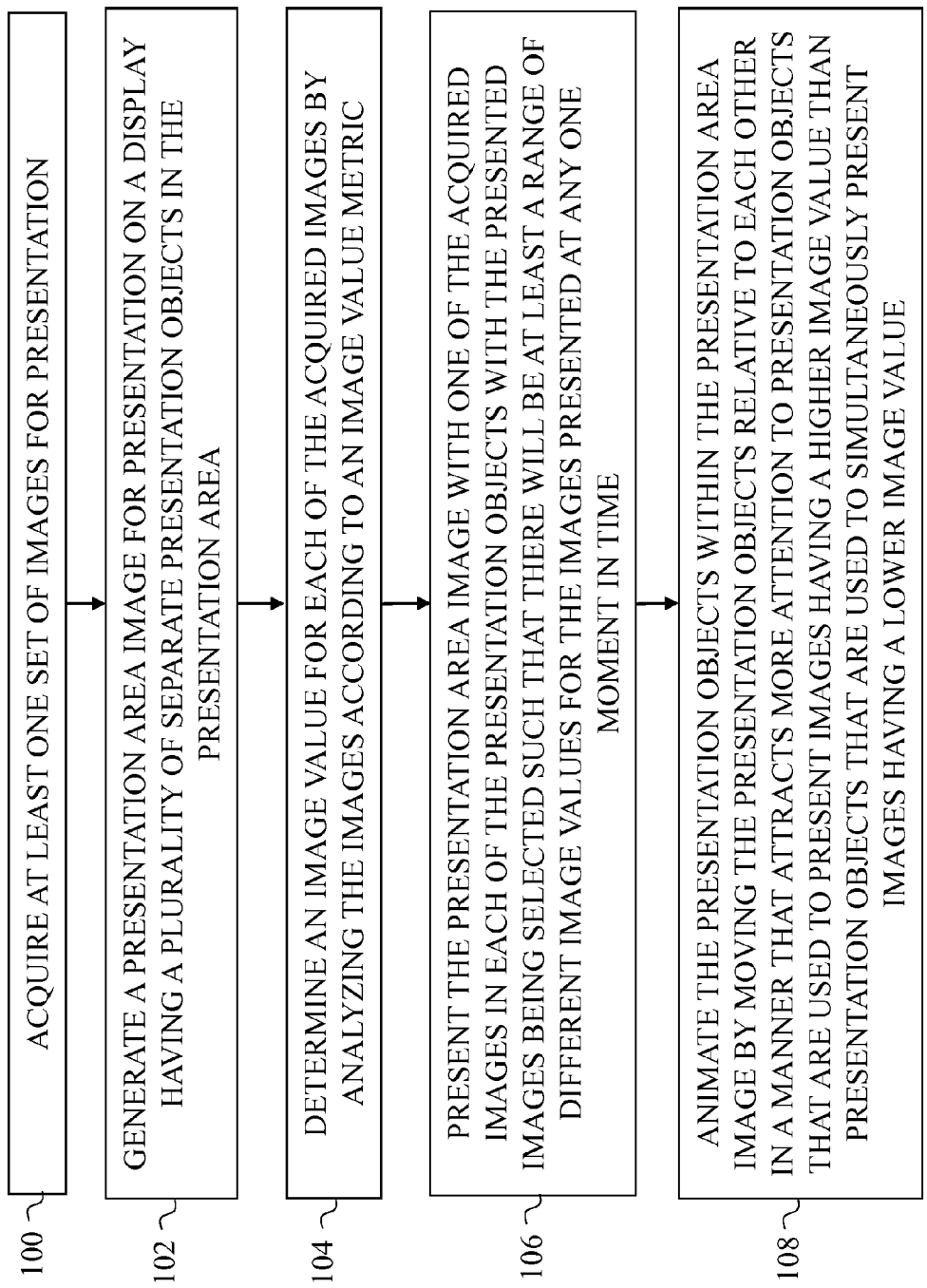
FIG. 3 is a flow diagram showing a method of image based presentation.

FIG. 3 is a flow diagram showing a method of image-based presentation. Those skilled in the art will recognize that the display of image based presentations can be on the display of a cell phone, a display associated with a computing device, an imaging device, a digital media frame, a digital media player or a television or any other appliance possessing a display for displaying images. Multiple displays can work in conjunction with these devices. In addition, multiple displays can present different presentations or the same presentation across the devices.

At least one set of images is acquired for presentation. (Step 100). Images can be selected from digital image collection 210 from image/data memory 330 or database 114. Images can be acquired with system-selected rules. Such rules can be associated with most recent images downloaded, image metadata or a theme that can be system-produced or chosen by a user. Images can be a still image, a graphic, a video sequence or an image visualization of information, text or a data file.

Figure 4:
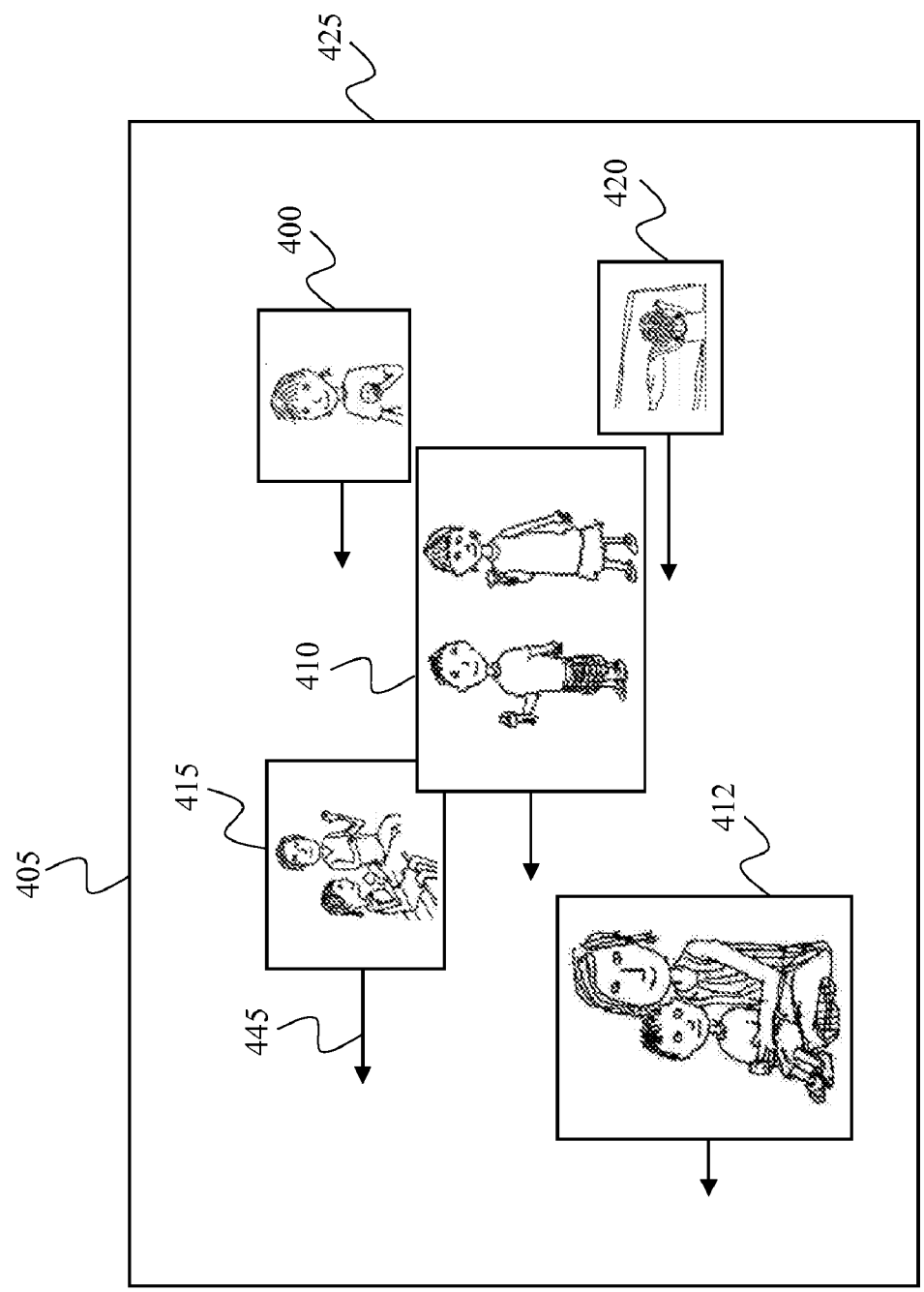
FIG. 4 is a representation of a presentation area containing presentation objects.

A presentation area containing presentation objects is generated having a presentation area image for presentation on color display 332 having a plurality of separate presentation objects in presentation areas. As illustrated in FIG. 4, presentation area 405 represents a color display 332 of multimedia presentation device 301. In some embodiments, color display 332 can be small as a one-inch cell phone screen. In one embodiment, multimedia presentation device 301 is a digital media player or digital media wall frame. In another embodiment, a computer monitor, and in yet another embodiment multimedia presentation device 301 is a digital television set. Background 425 can be a non-animation area within color display 332 that at least two displayable object types such as 410, 412, 415, 420 and 400 can move across. In one embodiment, background 425 can be a solid color. In other embodiments, background 425 can be artwork associated with a theme from graphics database 250 or from an image or a moving video clip from image database 200 or remote database 245. Large horizontal object 410 and large vertical object 412 represent locations of images for image presentation. These larger display areas are used for a set of images representing high value to the user and high correlation to a selected theme. Mid-size presentation objects 400 and 415 are for a set of content that is secondary to that placed in large horizontal object 410 and large vertical object 412. Small object 420 can be reserved for content that is ancillary to the theme or not of high image value.

In FIGS. 5A-5C, what is shown is a representation of layers of images. Layers are one embodiment for selecting a stratification scheme for presenting, at one time, the plurality of presentation objects in an ordered manner within presentation area 405. The strata are defined by the desired presentation attention for each ones of the ordered layers. Each respective layer can be associated with a range of image values, sets of acquired images or theme. Image objects are further provided with a motion vector 445. As illustrated, motion vectors 445 can represent an instance of the motion of associated with a movement path associated with a logical mathematical function in the display area. Moreover, layer 430 is a representation of a collection of large presentation objects and layer 435 is a representation of midsize presentation objects and layer 440 is a representation of small objects 420. In one embodiment, the cluster of objects in layer 430 will animate in a manner that is slower, appear in the foreground, and have a minimal translucency extent compared to presentation objects appearing in on layer 435 and layer 440. It should be noted that three layers are discussed in this example, however this is not limited and any number of layer greater than one can be used. It will be understood that any number of layers appropriate to the display of multimedia presentation device 301 can be implemented within the scope of the invention.

An image value for each of the acquired images is determined by analyzing the images according to an image value metric (Step 104). An image value metric can comprise several components that will sum into a single image value score. One component of image value can comprise image quality. Another component can comprise the colorfulness of the image. A further component can be that the eyes of a media subject are open or that the subject is smiling. Another image value component can be that the image media is aesthetically pleasing using rules of good composition. Other components of image value are determined based in part by automatically sensing who is watching or using multimedia presentation device 301. A user can be sensed based on recognition of a user based on a log-in ID, the use of a personal multimedia presentation device 301, such as the use of a personal cellular phone type of multimedia presentation device 301 by an owner or frequent user of that cellular phone, or based on facial recognition using an embodiment that includes an imaging system in multimedia presentation device 301 to capture an image of one or more users. From the image of the users, a mood of the users can further be determined to create themes. Activity can be determined to be a high-energy party, versus mellow and sitting on a couch. Furthermore, a personal based image value can be related the behavior of one or more users. This behavior can be frequency of viewing, utilizing certain media such as images tagged by the user or users as favorites, or a frequency of viewing a media object from a library or remote content such as a television station or show. Other methods of ranking personal based image value can be calculated in conjunction with how closely the person appearing in a media collection is in relation to the sensed user(s). Best friends or closest relatives can have higher values associated with a sensed user than friends of friends or distant relatives as documented in relational database 240.

The presentation area image is then presented with one of the acquired images in each of the presentation objects and with the presented images being selected such that there will be at least a range of different image values for the images presented at any one moment in time (Step 106). Image sets can be assigned to displayable presentation objects in association with image values. A presentation object characteristic can be continuously variable according to image value. Object characteristics are further associated with size, closeness to the center of the screen, speed, order, and translucency.

The presentation objects are then animated within the presentation area image by moving the presentation objects relative to each other in a manner that attracts more attention to presentation objects that are used to present images having a higher image value than presentation objects that are used to simultaneously present images having a lower image value (Step 108). As a result, various presentation objects will attract various levels of attention. Lower image value images can move faster through the presentation area while higher image value images can be larger and move slowly, commanding greater level of viewer attention. In certain embodiments, the animation of various presentation objects can be organized accordingly to what will be referred to herein as a motion metaphor. Motion metaphors that have large objects moving slowly in conjunction with fast moving small objects have a psychological benefit of maintaining viewer interest in the presentation. One such motion metaphor can be a solar system motion metaphor with small presentation objects apparently orbiting larger presentation objects.

Additional embodiments of the invention can incorporate themes for image presentation. A first theme for image presentation can be chosen using from a list of possible themes or thematic engine 270 can generate a first theme and a second theme using data mining engine 260. Thematic engine 270 can generate the first theme associated with a date, event or season of images. In one embodiment, data mining engine 260 can query a person profile database 235 to determine dates that are significant to a user. Such dates can include birthdays, anniversaries, faith-based holidays, or national holidays. In this embodiment, an anniversary of an upcoming event may be selected as a suitable theme. If the earliest significant anniversary of a significant event within person profile database 235 is December 25, and there are images associated with that date within the digital image collection 210, then on a viewing date of December 21st, the theme can be of last year's Christmas or a compilation of previous family Christmas celebrations. In addition, first, second and subsequent themes can be chosen based on any single metadata or semantic elements within a person's picture collection. If a recurring subject of a person's picture collection is swimming, a theme can be selected as swimming. Another may be the most photographed person or object. One or a group of friends, family or social network can represent a theme for imagery to present using relational database 240. Furthermore, visualization of media types can be themes. A theme can be of all of a type of television stations that are available to the viewer or of the recorded media on a media player. A theme can be a visualization of unread email in an email or message computer application. A theme can be the most recently viewed pictures, or the least recently viewed pictures in an image collection. Themes can be associated with frequency of other viewer activity such as most frequented U-Tube videos watched or other ranking criteria associated with a ranking list. Theme lists can be presented in pull down menus or managed by a viewer or user. Themes can be system generated and selected at random or selected with user controls 334 using associated key words from the images as capture metadata 215 and image content metadata 220. Event database 258 enables the data associated with an event to enable the acquisition of images supporting a theme. For example, a group of images from an event can be classified as images that depict family moments and/or family members.

When a family theme is later determined for presentation, digital processor 320 can search any available database or image/data memory 330 for images that depict family members. Thus, the images from that event are suitable imagery for this theme.

The image value can be further modified in accordance with how each of the acquired images corresponds to a theme. Degree of correspondence to a theme can be related to the key words associated with an image in capture metadata 215, image content metadata 220 generated by image content engine 280 by data mining engine 260. If the theme is camping, key words can include tent, hike, backpack, campfire, and outdoors. Through analyzing each key word, an image can have a degree of correspondence to the theme of camping. In this example, an image depicting a tent and campfire can have a relatively high correspondence to the camping theme while an image depicting people hiking or wearing backpacks can have a lower correspondence to the camping theme. Furthermore, if a theme is camping, animation can be assigned based on the theme of camping.

Figure 6A:
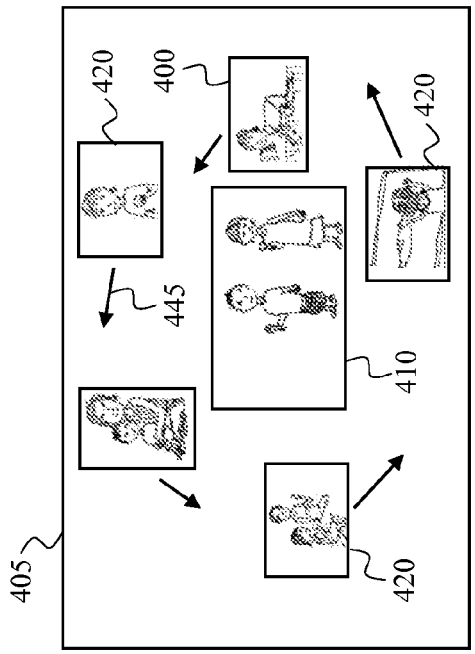
FIG. 6A is a representation of a theme of presentation objects in a motion metaphor of panning along water and rocks in a stream.

One example is illustrated in FIG. 6A, which shows a representation of a theme of presentation objects in a motion metaphor of panning along water and rocks in a stream. Higher valued images can be assigned to the large horizontal objects 410 that appear as rocks in an image. Lower image value images can be assigned to a "water" animation of small objects 420. As a result, the concurrent animation of panning or translating motion of a background image 425 or objects 410, 420 provides an illusion of a larger presentation area 405.

Figure 6C:
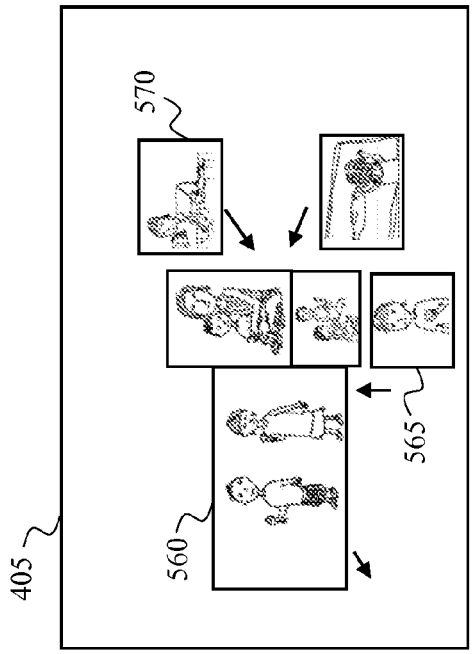
FIG. 6C is a representation of a centered presentation object and circling presentation objects.
Figure 6B:
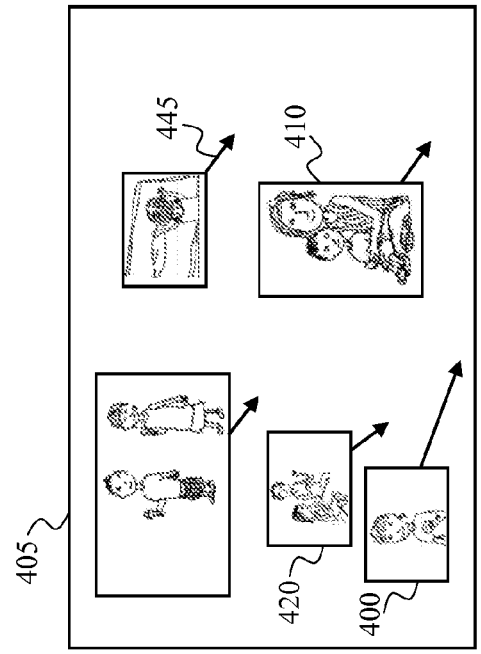
FIG. 6B is a representation of a navigation theme.

FIG. 6B shows a metaphor of traveling that can be appropriate, for example, when presenting images according to a navigating theme. Here large presentation object 527 can be centered and moves in a manner to grow in size on presentation area 405, as smaller presentation objects translated outward to the periphery of presentation area 405. Navigation theme can be applied to an event of a vacation or road trip. Each set of images can be associated with a sub-event to the main event. Image from the sets depicting sub-event sets can be displayed on the presentation objects concurrently or sequentially. Additionally, sets of images that can be defined by single or unique metadata elements thus enabling each set to have unique combinations of images and/or unique presentation characteristics.

FIG. 6C shows another motion metaphor having a centered presentation object and orbiting presentation objects. Motion metaphors can support a theme that centers on one set of images or preferred image. The image having the highest image value is promoted as large horizontal object 410 to attract the greatest attention while mid-sized presentation object 400 and small object 420 are actively promoted in circular or elliptical orbits about large horizontal object 410 that are animated in accordance with their image values. In this embodiment, equations of motion can dictate and be applied based on a mass related to the area of the object and related objects. In one example embodiment, a rate of circling can be determined using a calculated velocity that is based on a standard orbit equation.

Figure 6D:
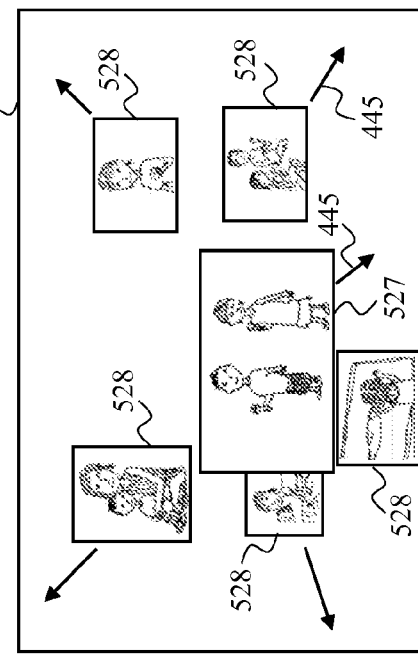
FIG. 6D is a representation of a building theme.

FIG. 6D shows another motion metaphor for use with a connecting theme. In this motion metaphor, presentation objects are clustered in a manner that corresponds to the passage of time or the growth of someone or something over time. This animation starts with grouping presentation object 560 and grows and produces connected images with each attached presentation object 565. This group of objects can move slowly across the screen in a manner that appears that a camera is panning across a scene while additional grouping presentation object 570 speed and link to the built up cluster of objects. These built up connected images of presentation objects 570 can be constructed using basic tessellation building blocks in sub-clusters of image shapes. Presentation objects are not limited to a 2:3 or 4:5 aspect ratio. Embodiments can include groupings of cropped images in various sized and shaped presentation objects. Commonly assigned U.S. Pat. No. 6,654,506 to Luo et al. and U.S. Pat. No. 6,654,507 to Luo, describe methods for automatically creating cropped and zoomed versions of photographic images wherein the method and computer program/system for cropping a digital image includes selecting a zoom factor and a crop window, positioning the crop window such that the crop window is centered on a main portion having a highest belief value of being the main subject, and cropping the image according to the crop window and automatically producing an image of a portion of a photographic image respectively. In addition, images can be cropped and divided into multiple image portions for presentation using various aspect ratios. Commonly assigned U.S. Pat. No. 6,654,507 to Luo describes a method and computer program/system for cropping a digital image includes selecting a zoom factor and a crop window, positioning the crop window such that the crop window is centered on a main portion having a highest belief value of being the main subject, and cropping the image according to the crop window. This main subject can be extracted using one crop window, and secondary subject can be extracted with another crop window in sequence.

Figure 7C:
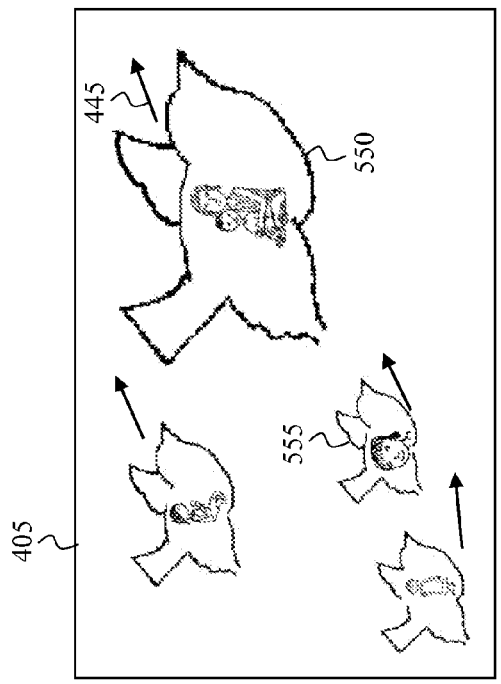
FIG. 7C is a representation of a flocking theme.
Figure 7D:
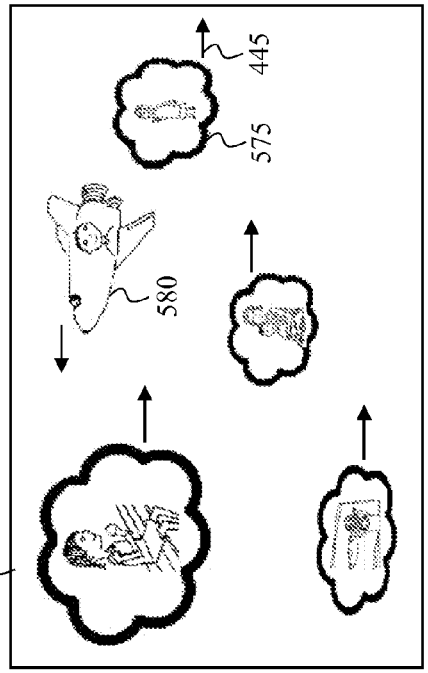
FIG. 7D is a representation of a passage theme.
Figure 7A:
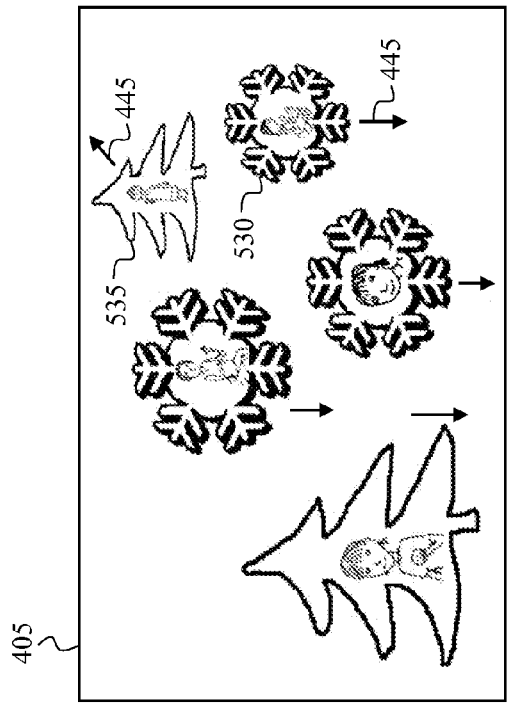
FIG. 7A is a representation of Christmas themes.

FIG. 7A shows a motion metaphor wherein presentation objects have shapes that are related to the theme to provide visual theme context. In this embodiment, the shape and border area of presentation object are aligned with the shapes that are associated with a Christmas theme. Images are cropped to within the shape of the presentation objects. Accordingly, presentation objects are in the shape of snowflakes and Christmas trees. The arrangement at the beginning and throughout the presentation of these presentation objects enables a mix of object sizes and patterns. For an example of Christmas as an upcoming event, there can be many themes associated with Christmas. A theme of "Christmas tree" is one embodiment of a theme associated with Christmas. People in front of the tree are Theme One. Data mining engine 260 can filter images from a set of images captured in the month of December for the presence of the color green. If there is a large presence of people in front of a green background that is close to the color of the tree, the degree of correspondence for theme one is high. In addition, if people and Christmas tree ornaments are sensed, there is an even higher likelihood that there is a tree in the image and as a result, a high correspondence to a Christmas tree set of images. Theme Two, getting the tree, can be determined by coats that the people are wearing, an outdoor classification based on lighting or background, the presence of green without ornaments, and snow in the picture. Referring back to FIG. 7A, Theme One (images of people in front of a tree), can be assigned to tree presentation object 535. Theme Two images can be assigned to snowflake presentation object 530. Animation can comprise of snow falling motion vector 445 for snowflake presentation object 530 which occurs concurrently with an animation of a panning motion of tree presentation object 535 suggesting movement up a hill of Christmas trees.

Figure 7B:
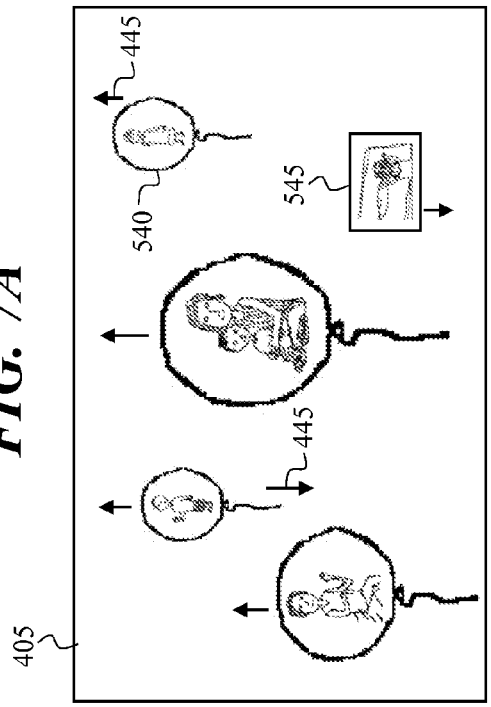
FIG. 7B is a representation of party themes.

FIG. 7B shows a motion metaphor wherein presentation objects 540 have shapes, such as balloon shapes, that are associated with a birthday party or celebration theme. Images from the birthday party can be inserted, zoomed and cropped within presentation objects 540 that have, for example, a balloon shape. In addition, animation of presentation objects 540 can be logically determined from the shape of the balloon presentation object 540 to provide an expected association from knowledge of motion characteristics of a tangible object represented by the shape of the presentation objects and/or determined based upon the theme for the movement of the object. The type of animation associated with, for example, helium balloons is typically traveling from low to high such that motion vector 445 is pointed up. Confetti presentation object 545, associated with a companion theme in this embodiment that takes on a motion vector 445 influenced by simulated gravity, a random Brownian motion, or swirling wind. With a swirling animation, object position, relative velocity and acceleration relationship can be modeled using fluid equations. In addition, salient contextual images or image objects of the birthday party event group of images can be concurrently displayed. With the birthday theme, a salient set of images include the birthday child's baby pictures and/or images depicting the child at different ages.

FIG. 7C shows motion metaphor wherein presentation objects 550 have avian shapes and are moved in accordance with a flocking theme having a leader bird presentation object 550 and follower bird presentation object 555 that can take on commonly known animations associated with flocking. Groups of bird shaped presentation objects 550 can flock in or out and swirl in and out of presentation area 405. Images can be cropped to the outline of the flocking bird presentation objects 550 and 555. Flocking birds can be selected for group activity events and themes. FIG. 7D shows a motion metaphor useful in representing a passage theme, and illustrates translating cloud presentation object 575 in many sizes. Images are cropped to the outline of cloud presentation objects 575 and transverse across presentation area 405. Companion theme airplane presentation object 580 can convey images of the person on the passage through space or time.

As with all of these embodiments, music and/or narration can play during the image presentation. Narration can be recorded and subsequently played during future presentations of the theme and images. Music can be associated with the theme of the presentation such as Christmas or a birthday. Music can be associated with the era of a sequence of pictures from a certain year like a popular musical hit from that year. Music can accompany the audio of a video presentation object. When a video presentation object is encountered and subsequently presented, music that is accompanying the presentation is attenuated, not terminated, to allow the audio of the video presentation object to be heard while the attenuated music provides continuity in the overall presentation. The presentation including the accompanying music and video object with audio can be further rendered to a format such as a DVD movie, slide show or the like. Attenuation of accompanying music to accommodate a video object is highly desirable. In other embodiments where multiple video clips are shown, the dominant video clip can have the loudest volume over smaller also playing video clips. The video and audio in conjunction with a display object can be played or restarted with a user interaction. With the user interaction, all other objects can mute. In some embodiments, the motion vector 445 can be sized for the speed of the presentation object such that it transverses the screen for an exact amount of time. This time can be associated with the entire playback time of a whole or trimmed video snippet.

Figure 8B:
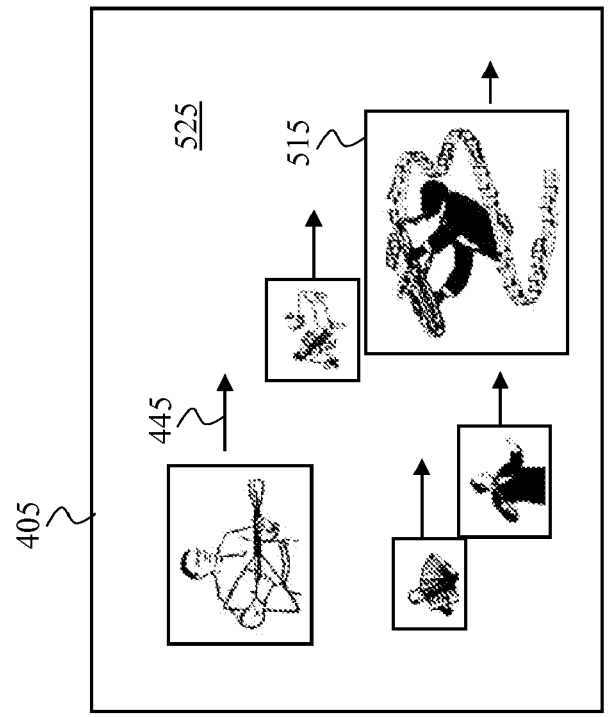
FIG. 8B is a representation of a media library.
Figure 8A:
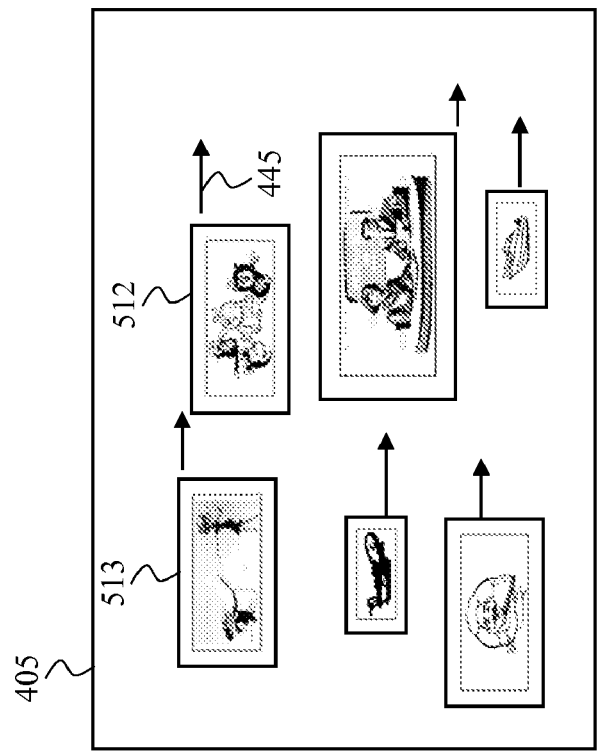
FIG. 8A is a representation of media playing from remote media source.

Referring to FIG. 8A, what is shown is a representation of media playing from a remote media source. As shown, media source outline 512 can appear over non-animated background 513 of a current channel. Media source outline 512 can represent current playing television channels over the air or via cable TV or streaming over the Internet 370. Sizes of media source outline can represent favorite shows or stations that sensed users prefer. Similarly, FIG. 8B represents media cover artwork 515 from a library of a media collection. Artwork can be a record album jacket, a CD jacket, a DVD or HD-DVD or similar media collection jacket. A playing selection can be represented as background 525 or as a moving or non-moving presentation object.

Figure 9:
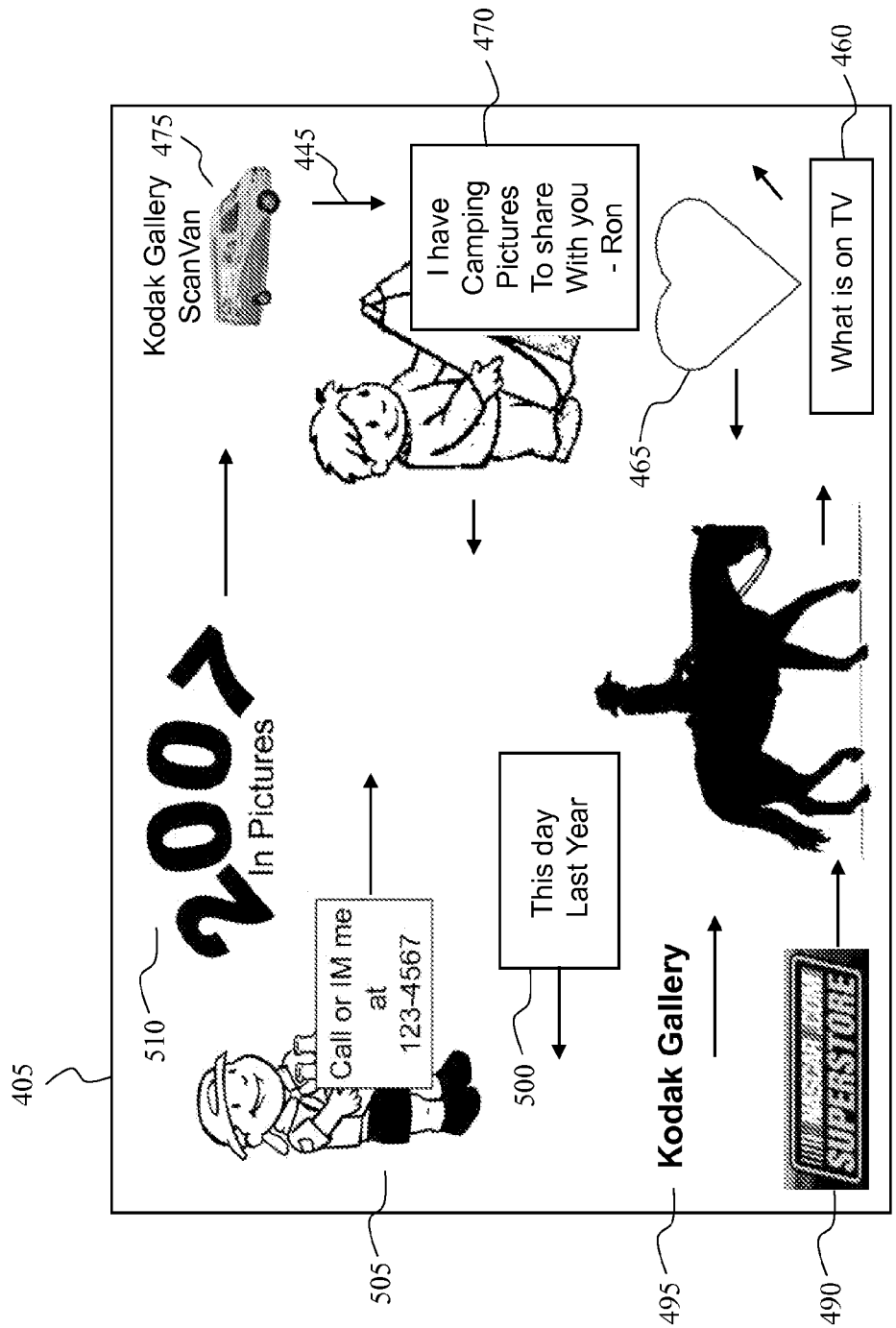
FIG. 9 is a representation of a theme of a menu of themes.

FIG. 9 is a representation of a menu of themes. A user can interact or click on the presentation objects that represent the theme and can launch into the theme and subsequent images within objects presented. For example, year in pictures theme 510 can launch a presentation associated with images captured in that year. Message theme 505 can link to a presentation of messages. Presentation object, "this day last year theme" 500 appears in conjunction with other themes such as Internet location theme 495. Theme icons 465 present themes that are available for viewing. Sharing message theme 470 can launch into another user's image collection from remote database 245. Service representation 475 and store representation 490 illustrate visualization of goods and services available in a theme presentation.

Figure 10A:
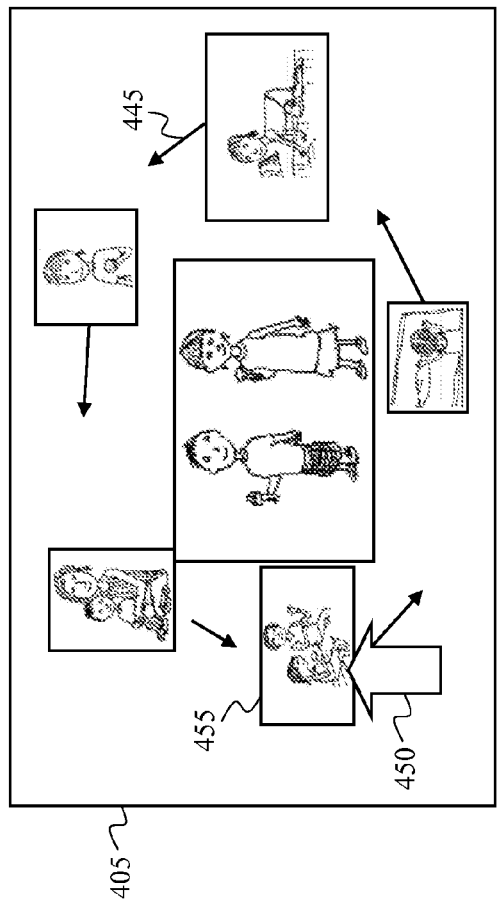
FIG. 10A is a representation of an interaction with moving presentation objects.
Figure 10B:
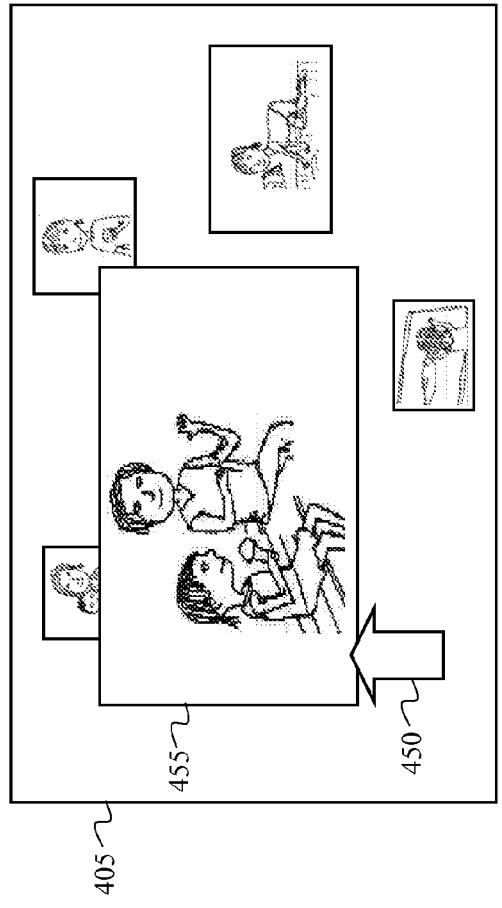
FIG. 10B is a representation of the paused objects after interaction.

FIG. 10A shows one embodiment of an interaction with moving presentation objects. A user control arrow 450 can click on a presentation object 455 containing an image. Pressing on the image directly using a touch screen interface on color display 332 can also perform this. As shown in FIG. 10B, clicking on the presentation object 455 brings the object to the foreground and pauses the motion of it and other objects. It can also enlarge it to fill some or all of the screen. Resuming image motion can be accomplished by clicking on the presentation object 455 again. Alternatively, clicking twice or right mouse clicking on presentation object 455 can present to the user a menu of options associated with presentation object 455. One set of options can present a list of all objects within or associated with that image. By selecting these objects, one can launch new themes, connect, search or send a message to the people within the images, or purchase products shown or represented within the image.

Figure 11:
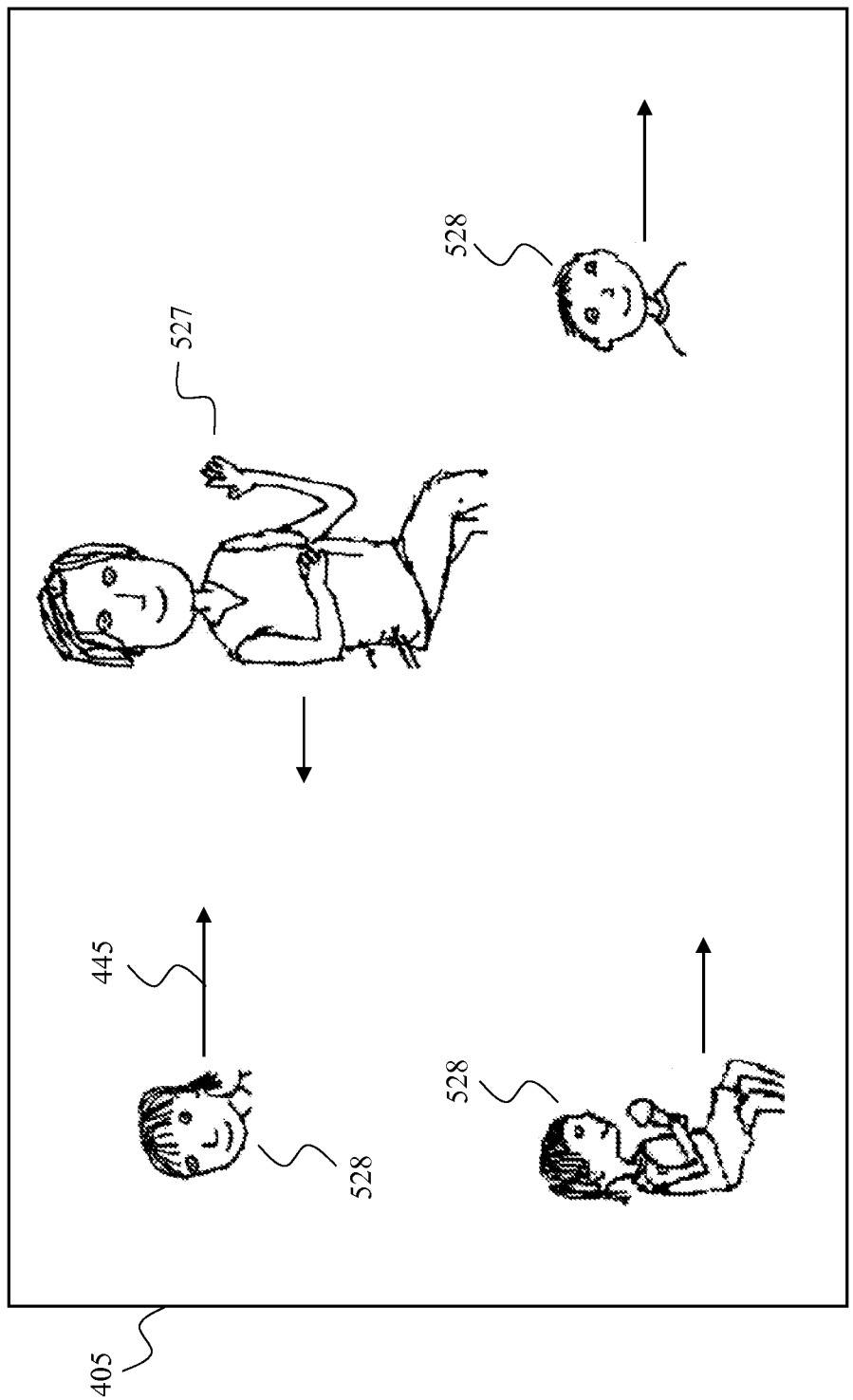
FIG. 11 is a representation of segmented portions of images used for presentation.

FIG. 11 shows the use of segmented portions of images used for presentation. Any image segment can be extracted from an image. Salient shapes of people such as heads and or bodies can be extracted from the images and the salient shapes are used as shapes to form presentation objects 527 and 528. This can also be performed for video objects on a frame-by-frame basis. Similarly, a border of various styles, colors and patterns can be placed around each of the presentation objects to denote the set associated with the objects. As cited earlier, relational database 240 works in conjunction with person profile database 235 to provide tree structure or unstructured data storage known as "triples" used by artificial intelligence engines. In one embodiment, the theme incorporates a primary set of content and at least one companion set of content defined according to the tree structure or "triple". A child can be the primary theme with one border color or pattern portion. Close associates of the child for example, the mother, father, and siblings can also be organized as companion sets of content, each with their own shape, frame or manner of animation.

Those skilled in the art will recognize that many variations can be made to the description of the present invention without significantly deviating from the scope of the present invention.

Parts List 100 step
102 step 104 step
106 step
108 step
200 image database
210 digital image collection
215 capture metadata
220 image content metadata
225 event engine
235 person profile database
240 relational database
245 remote database
250 graphics database
255 animation database
258 event database
260 data mining engine
265 rendering engine
270 thematic engine
275 image value engine
280 image content engine
285 remote media source
290 software engines
301 multimedia presentation device
303 flash
305 lens system
307 cable TV interface
311 CMOS image sensor
312 timing generator
314 image sensor array
316 A/D converter circuit
318 DRAM buffer memory
320 digital processor
322 RAM memory
324 real-time clock
325 location determiner
327 database
328 firmware memory
330 image/data memory
332 color display
334 user controls
340 audio codec
342 microphone
344 speaker
350 wireless modem
352 RF channel
358 phone network
362 dock interface
364 dock/charger
370 Internet
372 service provider
375 general control computer
400 mid-size object
405 presentation area
410 large horizontal object
412 large vertical object
415 presentation object
420 small object
425 background image
430 layer 1
435 layer 2
440 layer 3
445 motion vector
450 control arrow
455 presentation object
460 media source
465 theme icon
470 message theme
475 service representation
490 store representation
495 Internet location
500 this day last year theme
505 message theme
510 year in pictures theme
512 media source outline
513 background
515 media library outline
525 background
527 large presentation object
528 small presentation object
530 snowflake presentation object
535 tree presentation object
540 balloon presentation object
545 confetti presentation object
550 leader bird presentation object
555 follower bird presentation object
560 grouping presentation object
565 grouping presentation object
570 grouping presentation object
575 cloud presentation object
580 airplane presentation object

The invention claimed is:

1. A method for image presentation comprising the steps of:
acquiring at least one set of images for presentation;
generating a presentation area image for presentation on a display having a plurality of separate presentation objects in the presentation area;
determining an image value for each of the acquired images by analyzing the images according to an image value metric;
presenting the presentation area image with one of the acquired images in each of the presentation objects with the presented images being selected such that there will be at least a range of different image values for the images presented at any one moment in time;
animating the presentation objects within the presentation area image by moving the presentation objects relative to each other in a manner that attracts more attention to presentation objects that are used to present images having a higher image value than presentation objects that are used to simultaneously present images having a lower image value; and
extracting salient shapes from the images and wherein the salient shapes are used as shapes to form the presentation objects for the presentation images that are used to present portions of the images.

2. The method of claim 1, wherein the presentation objects are animated to attract more attention by providing variations in at least one of the following: a velocity of movement of the presentation objects, an acceleration of movement of the presentation objects, or a pattern of movement of the presentation objects.

3. The method of claim 1, further comprising determining a theme wherein the at least one set of images is acquired based upon the theme.

4. The method of claim 3, wherein the image value for each of the acquired images is further determined by a degree of correspondence to the theme.

5. The method of claim 1, wherein the presentation objects are further actively promoted to attract more attention relative to each other by providing variations in at least one of the following: a size of displayable objects, a shape of the displayable objects, an arrangement of the displayable objects before animation, an arrangement of the displayable objects after animation, the appearance of a border portion of the displayable objects, or an extent of a translucency of the displayable objects.

6. The method of claim 1, wherein the image associated with the highest image value comprises a motion video image having a source audio track or sequences of images associated with a source audio track, wherein a primary audio track is provided during presentation of the images, and wherein the primary audio track is based upon the source audio track.

7. The method of claim 1, wherein the duration of presentation of a presentation object on the screen is based on the length of the video segment to enable entire playback of the video segment.

8. The method of claim 1, wherein the manner of animation of two of presentation objects is calculated such that they appear to move relative to each other in a manner according to a relationship dictated by a logical or mathematical function.

9. The method of claim 1, wherein the size of the displayable object is determined by its manner of animation whereby a larger object moves slower than a smaller object.

10. The method of claim 1, wherein the animation occurs concurrently with a panning or translating motion of a background image to provide an illusion of a larger presentation space.

11. The method of claim 1, wherein a user interaction on a presentation object that represents a set of images launches the represented set into an animation sequence.

12. The method of claim 3, wherein the presentation objects have shapes that are related to the theme so as to visually suggest a context based upon the theme.

13. The method of claim 3, wherein the manner of animation is related to the theme to provide an animation consistent with the theme.

14. The method of claim 3, wherein a primary audio track is provided during presentation of the images, and wherein said primary audio track comprises music selected based upon the theme to provide contextual audio information.

15. The method of claim 3, where a theme is determined by analysis of the organization of a portion of a tree structure of a relational database used to store image content information for the images used for presentation wherein the theme incorporates a primary set of images and at least one companion set of images defined according to the tree structure.

16. The method of claim 3, where the theme represents a grouping of images associated with an event and the acquired sets of images for presentation are in association with the event theme; further comprising image sets from the sub-events that make up the event.

17. The method of claim 3, wherein a theme of presentation comprises an acquired set of images organized with reference to one person and wherein additional acquired sets are organized according to persons that are known to be associates of the one person.

18. The method of claim 17, further comprising acquired sets of images according to groups of individuals that reflect a social network associated with the primary person.

19. A method for image presentation comprising the steps of:
acquiring at least one set of images for presentation;
generating a presentation area image for presentation on a display having a plurality of separate presentation objects in the presentation area;
determining an image value for each of the acquired images by analyzing the images according to an image value metric;
presenting the presentation area image with one of the acquired images in each of the presentation objects with the presented images being selected such that there will be at least a range of different image values for the images presented at any one moment in time;
animating the presentation objects within the presentation area image by moving the presentation objects relative to each other in a manner that attracts more attention to presentation objects that are used to present images having a higher image value than presentation objects that are used to simultaneously present images having a lower image value;
determining a theme wherein the at least one set of images is acquired based upon the theme, wherein the presentation objects have shapes that are related to the theme so as to visually suggest a context based upon the theme; and
determining from the shape of the presentation object, a clear context for the movement of the object.

20. A method for image presentation comprising the steps of:
acquiring at least one set of images for presentation;
generating a presentation area image for presentation on a display having a plurality of separate presentation objects in the presentation area;
determining an image value for each of the acquired images by analyzing the images according to an image value metric;
presenting the presentation area image with one of the acquired images in each of the presentation objects with the presented images being selected such that there will be at least a range of different image values for the images presented at any one moment in time;
animating the presentation objects within the presentation area image by moving the presentation objects relative to each other in a manner that attracts more attention to presentation objects that are used to present images having a higher image value than presentation objects that are used to simultaneously present images having a lower image value;
determining a theme wherein the at least one set of images is acquired based upon the theme;
determining a background image based upon the theme, wherein the presentation area image has the background image, and;
automatically segmenting the background image into at least an animation segment and a non-animation segment said animation segment containing image information related to the theme and wherein and the presentation objects are animated only within the animation segment.

* * * * *